(12) United States Patent
Saraswat et al.

(10) Patent No.: US 11,709,854 B2
(45) Date of Patent: Jul. 25, 2023

(54) ARTIFICIAL INTELLIGENCE BASED SMART DATA ENGINE

(71) Applicant: Bank of America Corporation, Charlotte, NC (US)

(72) Inventors: Nitin Saraswat, Gurugram (IN); Rishi Jhamb, Gurgaon (IN)

(73) Assignee: Bank of America Corporation, Charlotte, NC (US)

( * ) Notice: Subject to any disclaimer, the term of this patent is extended or adjusted under 35 U.S.C. 154(b) by 1272 days.

(21) Appl. No.: 15/860,363

(22) Filed: Jan. 2, 2018

(65) Prior Publication Data

US 2019/0205636 A1 Jul. 4, 2019

(51) Int. Cl.
| | | |
|---|---|---|
| *G06V 30/10* | (2022.01) | |
| *G06F 16/25* | (2019.01) | |
| *G06N 5/048* | (2023.01) | |
| *G06F 16/93* | (2019.01) | |
| *G06F 16/33* | (2019.01) | |
| *G06F 16/951* | (2019.01) | |
| *G06V 30/414* | (2022.01) | |

(Continued)

(52) U.S. Cl.
CPC .......... *G06F 16/254* (2019.01); *G06F 16/334* (2019.01); *G06F 16/93* (2019.01); *G06F 16/951* (2019.01); *G06N 3/042* (2023.01); *G06N 3/044* (2023.01); *G06N 5/048* (2013.01); *G06V 10/82* (2022.01); *G06V 30/412* (2022.01); *G06V 30/413* (2022.01); *G06V 30/414* (2022.01); *G06V 30/10* (2022.01)

(58) Field of Classification Search
CPC ............. G06K 9/00463; G06K 9/4628; G06K 2209/01; G06F 16/254; G06F 16/334; G06F 16/93; G06F 16/951; G06N 3/0427; G06N 3/0445; G06N 5/048
See application file for complete search history.

(56) References Cited

U.S. PATENT DOCUMENTS

| | | | |
|---|---|---|---|
| 6,553,385 B2 | 4/2003 | Johnson et al. | |
| 7,499,588 B2 | 3/2009 | Jacobs et al. | |

(Continued)

OTHER PUBLICATIONS

Rahman et al., Understanding the Logical and Semantic Structure of Large Documents, 10 pages, Sep. 2017. (Year: 2017).*

*Primary Examiner* — Kamran Afshar
*Assistant Examiner* — Marshall L Werner
(74) *Attorney, Agent, or Firm* — Banner & Witcoff, Ltd.

(57) ABSTRACT

A machine learning computing system for extracting structured data objects from electronic documents comprising unstructured text includes a first data repository storing a plurality of electronic documents including at least one text data object and an expert system computing device. The expert system computing device includes a processor and a non-transitory memory device storing instructions causing the expert system to receive a first data object comprising unstructured data identified from an electronic document stored in the first data repository, process, a first set of rules to identify at least one key-value pair data object from the first data object; process, by an inference engine module, a second set of rules to identify at least one free text data object from the first data object and store, in a non-transitory memory device, the at least one key-value pair and the at least one free text data object.

20 Claims, 13 Drawing Sheets

Workflow of AI based Smart Data Engine

(51) Int. Cl.
*G06N 3/042* (2023.01)
*G06N 3/044* (2023.01)
*G06V 10/82* (2022.01)
*G06V 30/412* (2022.01)
*G06V 30/413* (2022.01)

(56) References Cited

U.S. PATENT DOCUMENTS

| | | |
|---|---|---|
| 7,593,927 B2 | 9/2009 | MacLennan et al. |
| 8,249,344 B2 | 8/2012 | Viola et al. |
| 8,266,148 B2 | 9/2012 | Guha et al. |
| 8,392,816 B2 | 3/2013 | Radakovic et al. |
| 8,676,731 B1 | 3/2014 | Sathyanarayana et al. |
| 9,378,200 B1 | 6/2016 | Cohen et al. |
| 9,646,262 B2 | 5/2017 | Phillipps et al. |
| 2007/0169063 A1* | 7/2007 | Bauman .................. G06F 9/453 717/162 |
| 2009/0063470 A1* | 3/2009 | Peled .................... G06F 40/295 707/999.005 |
| 2017/0286803 A1* | 10/2017 | Singh ............... G06V 30/19133 |
| 2018/0024983 A1* | 1/2018 | Guzman ............. G06V 30/416 715/234 |
| 2018/0341688 A1* | 11/2018 | Ganesh ............... G06F 16/2465 |
| 2020/0042583 A1* | 2/2020 | Wang ..................... G06F 40/20 |

\* cited by examiner

500

Company Name
Address
City, state, zip

LOGO

Contact Details (Company Name)
Telephone: nnn-nnn-nnnn
Fax         mmm-mmm-mmm
Website: Companywebsite
Email: Contact@companyname.___

Reference No.: NNNNNNNN

Date:           27 September 2012

To:             Company Name_2

Attention:      DERIVATIVE CONFIRMATIONS

E-Mail:         Contact email address

From:           Company Name

Re: Swap Transaction

Dear Sir or Madam

The purpose of this letter is to confirm the terms and conditions of the Transaction entered into between Company Name                    and  Company Name_2                    ("Counterparty") on the Trade Date specified below (the "Swap Transaction").

The definitions and provisions contained in the 2006 ISDA Definitions, as published by the International Swaps and Derivatives Association, Inc. (the "Definitions"), are incorporated into this Confirmation. In the event of any inconsistency between the Definitions and the terms of this Confirmation, this Confirmation will govern.

LOGO_2

To: Company Name
Address
City, state, zip
United States
Attn: Derivative Operations
Telephone:
Fax: nnn-nnn-nnnn
mmm-mmm-mmmm From: Company Name_2
Address
City, state, zip
United States
Department: Swaps Department
Telephone:
Fax: nnn-nnn-nnnn
mmm-mmm-mmmm Date: 26th September 2012

Our Reference No:
Internal Tracking No: xxxxxxxxx
Admin No: yyyyyyyy
zzzzzzzzzzzz Dear Sir/Madam, The purpose of this letter agreement is to confirm the terms and conditions of the Transaction entered into between Company Name and Company Name_2 (each a "party" and together "the parties") on the Trade Date specified below (the "Transaction"). This letter agreement constitutes a "Confirmation" as referred to in the ISDA Master Agreement specified below (the "Agreement").

The definitions and provisions contained in the 2006 ISDA Definitions, as published by the International Swaps and Derivatives Association, Inc., (the "Definitions") are incorporated into this Confirmation. In the event of any inconsistency between the Definitions and this Confirmation, this Confirmation will govern.

This Confirmation supplements, forms part of, and is subject to, the ISDA Master Agreement dated as of 28th July 2009, as amended and supplemented from time to time, between the parties. All provisions contained in the Agreement govern this Confirmation except as expressly modified below.

Company Name
Address
City, state, zip

Date:  4 September 1998

To: Company Name_2
Attention: Derivatives Confirmations
E-Mail: name@company Name_2.___
From: Company Name SGFP Payment Amounts
SGFP Floating Amounts
Floating Rate Payer:    SGFP
Notional Amount:    GBP 150,000.00
Trade Date: 2 September 1998
Effective Date: 2 September 1998
Termination Date:   2 September 2004, subject to adjustment in accordance with the Modified Following Business Day Convention.
Business Days:  London, unless indicated otherwise Floating Rate Payer Payment Dates:  12 March, 12 July, 12 October in every year, commencing 12 October 1998 and ending on 12 December subject to adjustment in accordance with the modified following day business convention.
Floating Rate Option:   GBP-WMBA-SONIA-COMPOUND
Reset Dates:   The last day of each calculation period
Spread: None
Floating Rate Day Count Fraction:   Actual/365(Fixed)
Floating Rate Business Days:   London

Company Name_2
To: Company Name, Address, City, state, zip
Attn: Derivatives Operations
Telephone: xxx-xxx-xxxx
Fax: yyy-yyy-yyyy
From: Company Name_2, Address, City, State, Zip
Department: Swaps Department
Telephone: nnn-nnn-nnnn
Fax: yyy-yyy-yyyy
Date: September 2, 1998
Our Reference Number: xxxxxxxxxxx
Internal Tracking Number yyyyyyyyy
Admin No.: zzzzzzzzzzzzz General Terms
The terms of the particular transaction to which confirmation relates are as follows:
Notional Amount:    GBP 150,000.00
Trade Date: 2nd September 1998
Effective Date: 2nd September 1998
Termination Date:    2 September 2004, subject to adjustment in accordance with the Modified Following Business Day Convention.

Floating Rate for initial calculation period:  to be determined
Floating Rate Option:   GBP-LIBOR-BBA
Designated Maturity:   3 Month
Spread: Minus 0.134286 per cent
Floating Rate Day Count Fraction:   Actual/365(Fixed)
Reset Dates:   First Day of each Calculation Period
Floating Amounts:
Floating Rate Payer: Party B
Floating Rate Option:   GBP-WMBA-SONIA-COMPOUND
Spread: None
Business Days:  London
Calculation Agent:  Party A unless otherwise specified in the Agreement

FIG. 6B

| CHECKLIST | Company Name_2 | Company Name | Percent Match | Score (Pass/Fail) |
|---|---|---|---|---|
| TRADE ID: DOC ID: | ML conf (pdf) /CP conf (Tiff) | ML CONF PDF/CP conf PDF | | |
| GENERAL TERMS | | | | |
| Counterparty Name | Company Name_2/Company Name | Company Name_2/Company Name | 100% | Pass |
| Counterparty Location / Office | The Office of Party B for this Transaction is: New York, NY, United States | The office location for Company Name is New York | 95% | Pass |
| Our Location / Office / Entity | The Office of Party A for this Transaction is: | The office location for Counterparty is: | 95% | Pass |
| ISDA Definitions | | | | |
| Type of Master Agreement | | | | |
| Master Agreement Date | | | | |
| Currency & Notional (For all legs) | TRY 322,676,000.00 | USD 200,000,000.00 | 100% | Pass |
| Trade Date (For all legs) | 10th August 2012 | 23 September 2012 | 100% | Pass |
| Effective Date (For all legs) | 14th August 2012 | 25 September 2012 | 100% | Pass |
| Maturity Date (For all legs) | 14th August 2013 | 25 September 2013 | 100% | Pass |
| LEG 1 | | | | |
| Flow Direction (Who Pays/Receives) | Party A | NGFP | 100% | Pass |
| Roll Date / Frequency / Business Days Convention / Roll Date Type (For Calculation) | | | | |
| Fixed Rate | 6.35000 per cent | 6.2% per annum | 100% | Pass |
| Day Count Fraction | Actual/360 | Actual/360 | 100% | Pass |
| Business Days (For both Calculation & Payment) | London and New York | London | 100% | Pass |
| LEG 2 | | | | |
| Flow Direction / Who Pays | Party B | Counterparty | 100% | Pass |
| Roll Date / Frequency / Business Days Convention / Roll Date Type (For Calculation) | | | | |
| Frequency / Business Days Convention | | | | |

FIG. 7

FIG. 8A — Sample W-8BEN form which contains details like Customer Name, Country etc.

FIG. 8B — OCR Output as unstructured text

Output html file from
OCR Engine

Final Output File

Export the relevant in a variety of target file formats/databases with relevant authorization

| | A | B |
|---|---|---|
| 1 | | 0 |
| 2 | Type of Tax Form | FORM W-8BEN |
| 3 | Name | FirstName LastName |
| 4 | Type of Benefical Owner | INDIVIDUAL |
| 5 | Address | Street Address |
| 6 | City | FIRENZE, ITALY 50144 |
| 7 | Country | ITALY |
| 8 | SSN_ITIN | nnnnnnnnn - SSN |
| 9 | Certify | THE BENEFICIAL OWNER IS A RESIDENT OF ATAJ X WITHIN THE MEANING OF THE INCOME TAX TREATY BETWEEN THE UNITED STATES AND THAT COUNTRY |
| 10 | Special Conditions | SPECIAL RATES AND CONDITIONS (IF APPLICABLE SEE INSTRUCTIONS): THE BENEFICIAL OWNER IS CLAIMING THE PROVISIONS OF ARTICLE .OF THE SAMP- ROYALTY INCOME TREATY IDENTIFIED ON LINE 9A ABOVE TO CLAIM A.............% RATE OF WITHHOLDING ON (SPECIFY TYPE OF INCOME):. EXPLAIN THE REASONS THE BENEFICIAL OWNER MEETS THE TERMS OF THE TREATY ARTICLE: |

FIG. 13

ARTIFICIAL INTELLIGENCE BASED SMART DATA ENGINE

BACKGROUND

Aspects of the disclosure relate to artificial intelligence based image processing systems. In particular, one or more aspects of the disclosure relate to provide an artificial intelligence based image processing system and method for efficiently processing unstructured documents.

Business organizations receive and process large amounts of physical communications, electronic communications, and/or digital documents that may include information important to many business functions and/or client communications. As such, Massive amounts of information may be available for processing from scanned images of the physical documents and/or the electronic communications or other digital documents available across the industry. In many cases, any data extraction of usable data from such sources may be an extremely difficult task due to the lack of generic integrated solutions that can be scaled horizontally and vertically across industries and/or processes. As such, businesses often deploy large amounts of labor to perform data extraction from scanned images, digital communications, digital documents, and the like. Often, human interaction has been necessary to make sense of the scanned documents before pushing extracted information to target systems and/or structuring the scanned information for further use. Examples of scanned and/or digital unstructured documents may include derivative contracts between business organizations (e.g., a technology company, a bank, a financial institution, and the like), legal contracts, scanned receipts and associated documents, digital contracts. As such, manual processing of such diverse scanned documents is time consuming, inefficient and requires large amounts of manpower to identify relevant information due to the unstructured format of these documents. At present, no direct solution exits to process the unstructured data from the scanned/digital documents to make it usable for machine learning applications. As such, a need has been recognized for an artificial intelligence based smart data engine capable of processing large amounts of unstructured data to prepare and structure the data for use by other computer-based applications.

SUMMARY

The following presents a simplified summary in order to provide a basic understanding of some aspects of the disclosure. The summary is not an extensive overview of the disclosure. It is intended neither to identify key or critical elements of the disclosure nor to delineate the scope of the disclosure. The following summary merely presents some concepts of the disclosure in a simplified form as a prelude to the description below.

A machine learning computing system for extracting structured data objects from electronic documents comprising unstructured text includes a first data repository storing a plurality of electronic documents including at least one text data object and an expert system computing device. The expert system computing device includes a processor and a non-transitory memory device storing instructions that, when executed by the processor, cause the expert system computing device to receive, via a communication interface, a first data object comprising unstructured data identified from the at least one text data object of an electronic document stored in the first data repository, process, by an inference engine module, a first set of rules to identify at least one key-value pair data object from the first data object; process, by an inference engine module, a second set of rules to identify at least one free text data object from the first data object and store, in a non-transitory memory device, the at least one key-value pair and the at least one free text data object.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIGS. 5A and 5B show illustrative transaction documents processed by the artificial intelligence based smart data engine computing system according to one or more aspects of the disclosure;

FIGS. 6A and 6B show illustrative key-value pair data identified from transaction documents processed by the artificial intelligence based smart data engine computing system according to one or more aspects of the disclosure;

FIG. 7 shows illustrative comparison data for transaction documents processed by the artificial intelligence based smart data engine computing system according to one or more aspects of the disclosure;

FIGS. 8A and 8B show an illustrative tax form and identified text processed by the artificial intelligence based smart data engine computing system according to one or more aspects of the disclosure;

FIG. 9 shows an illustrative hypertext markup language (HTML) file output from an optical character recognition (OCR) engine of the artificial intelligence based smart data engine computing system according to one or more aspects of the disclosure;

FIG. 11 shows illustrative textual analytics code processed by the artificial intelligence based smart data engine computing system according to one or more aspects of the disclosure;

FIG. 12 shows illustrative data frame generation code processed by the artificial intelligence based smart data engine computing system according to one or more aspects of the disclosure; and FIG. 13 shows an illustrative output file from the artificial intelligence based smart data engine computing system according to one or more aspects of the disclosure.

DETAILED DESCRIPTION

Figure 1:
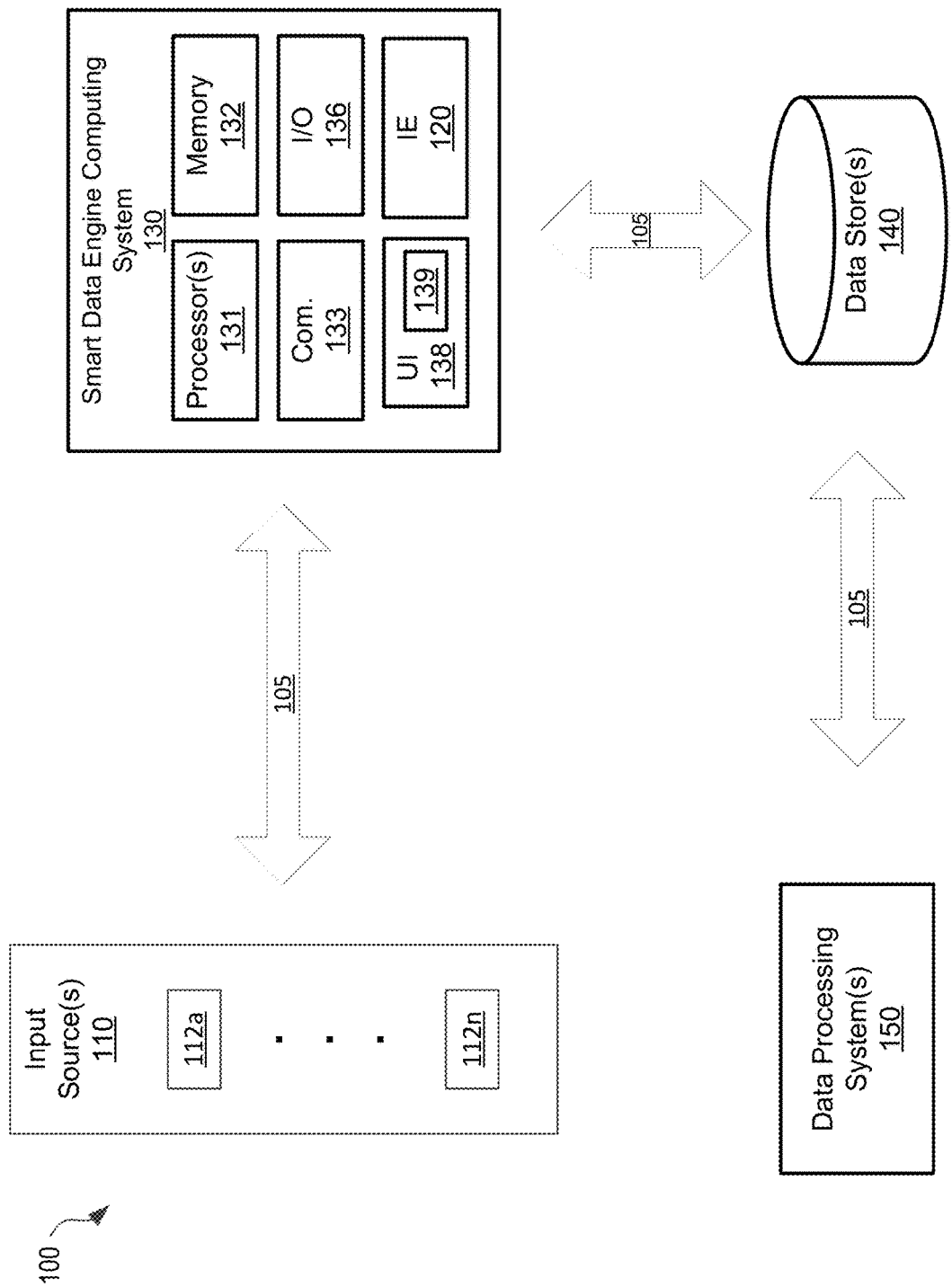
FIG. 1 shows an illustrative artificial intelligence based smart data engine computing system according to one or more aspects of the disclosure.

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer-readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In some cases, an integrated framework may be used to extract unstructured data from scanned images, digital communications and/or other digital documents to /pdfs and make it usable by other computer-based systems expecting structured data. The integrated framework may extract unstructured data from digital documents and/or digital images by applying Machine Learning in combination with Natural Language Processing and/or Regular Expressions. This integrated framework may leverage an optical character recognition (OCR) engine as a first step and process the extracted data through one or more layers of mathematical logic to process the extracted unstructured data into to usable structured data for use by one or more Machine Learning based applications or other data intensive applications. In some cases, the integrated framework may be used to enable a robotic process automation pipeline to process unstructured data extracted from a large variety of data formats into structured data easily processed in a variety of other processes.

In some cases, the integrated framework may include one or more components, including an expert system with a dictionary based data repository to manage a knowledge base that may be updated continuously and/or to extract meaningful data from a variety of source file formats. A strength of this solution is the three-layer mathematical logic implemented in a common computer language (e.g., python, C, C++, Java, and/or the like) to generates key/value pairs and/or summarized data elements. An illustrative first layer may be used to leverage an inference engine of the expert system to extract key/value pairs and free text, such as from an unstructured document processed by an OCR engine. An illustrative second layer may implement a recurrent neural network for extracting keywords by crawling business/industry documents and incorporating a feedback loop to update and/or validate the keywords and/or rules for identifying keywords. This second layer may then store the extracted information in a memory, such as an in-memory (e.g., local) database. An illustrative third layer may be used to calculate one or more confidence score values (e.g., a Precision/Recall score, an F1 score, and the like) to assign confidence levels to each key value pairs and/or each free text field.

The artificial intelligence (AI) based smart data engine does not operate using a conventional image comparison or data extraction algorithm where the input images have a standard/similar structure. Instead, the AI based smart data engine may leverage machine learning and natural language processing to extract data from an unstructured image/document data and process the unstructured data to make it usable in a variety of applications. Since the framework runs on a machine learning backbone, has natural language processing capabilities and is trainable, the output metrics may be improved through use and may be automatically adaptable, as more and varied data is processed by the framework. Such improvement has been seen in a number of test iterations.

The framework may be adapted to a variety of use cases through minor changes. As such, the framework may be considered to be an adaptable framework capable of being deployed in different architectures and/or technology stacks. The framework is significantly fast and can process a 10-page document in less than 4 seconds, and may be scaled and/or customized to a number of use cases such as by adding a spark architecture to the processing engine.

Even the best OCR engines currently available have limited tuning features and, therefore, are unable to render unstructured data from varied of formatted and/or unformatted input sources, into a structured form usable for machine learning and/or natural language processing algorithms. In many cases, a document may include two kinds of information, objective type information (e.g., name, country, date of contract, and the like) and subjective type information (e.g., terms and conditions, execution of contract details, and the like). The illustrative framework may deliver content extracted from a digital document as a structured file/object, which may include one or more key/value pairs for objective fields, a precise summarization of free text fields and/or highlighting top key points. Once this content has been extracted from the document, the structured data may be processed in a number of ways.

FIG. 1 shows an illustrative artificial intelligence based smart data engine computing system 100 according to one or more aspects of the disclosure. In some cases the illustrative artificial intelligence based smart data engine computing system 100 may include one or more input sources 110, communicatively coupled by a network to a smart data engine computing system 130 processing instructions implementing an expert engine (e.g., an inference engine 120), one or more data repositories 140 and a plurality of data processing systems 150 communicatively coupled to the data repositories to process information extracted from scanned images of documents containing unstructured data. The input sources 110 may include a plurality of data sources 112*a*-112*n* that each may include a computing device communicatively coupled to a scanner or other imaging device to obtain an image of a document. These images may be stored in a central location (e.g., the data repository 140) or at one or more remote locations associated with a data source 112*a*-112*n*.

In some cases, the smart data engine computing system 130 may be specifically programmed to provide a machine-learning-based image processing and data analysis computing system and may include at least one processor 131, one or more memory devices 132, a communication interface 133, an input/output (I/O) interface, a user interface 138 that may be used to present one or more user interface screens 139 to a user. The smart data engine computing system 130 may be specifically programmed to include one or more components of an expert system based inference engine 120 an/or other analysis modules. The smart data engine computing system 130 may include one or more data repositories such as a data repository 140 storing data structures corresponding to key value pairs, scanned image data, free text data, and/or the like. In some cases, the smart data engine computing system 130 may include, or be communicatively coupled via a network 105 to one or both of an input source(s) 110 and/or the one or more data repositories 140.

In some cases, the smart data engine computing system 130 may include the processor 131, or a plurality of processors, for controlling overall operation of the smart data engine computing system 130 and its associated components, including the one or more memory devices 132 (e.g., a non-transitory memory device, a random access memory (RAM) device, a read only memory (ROM), and the like), the I/O interface 136, and the like. The smart data engine computing system 130 may communicate with one or more external devices, such as the input sources 110, the one or more data processing systems 150, and/or the like (e.g., external user devices, and the like) via the communication interface 133. In some cases, the data repository 140 and/or the inference engine 120 may be included in a distributed system, where one or more of the components of the inference engine and/or data repositories may be incorporated into at least one computing device separate from the smart data engine computing system 130. In some cases, one or both of the inference engine 120 and the data repository 140 may be incorporated in a portion of the smart data engine computing system 130.

The I/O interface 136 may include one or more user interfaces, such as a microphone, a keypad, one or more buttons, one or more switches, a touch screen, a stylus, one or more pressure sensors, one or more biometric sensors, and/or one or more other sensors (e.g., a heat sensor, a humidity sensor, and the like) through which a user of the smart data engine computing system 130 may provide input, and may also include one or more of a speaker for providing audio output and a video display device for providing textual, audiovisual and/or graphical output. Software, or other executable code segments, may be stored within the one or more memory devices 132 and/or storage to provide instructions to the one or more processors 131 for enabling the smart data engine computing system 130 to perform various actions. For example, the one or more memory device 133 may store software used by the smart data engine computing system 130, such as an operating system, application programs, and the associated data repositories (e.g., the data repository 140). The various hardware memory units of the one or more memory devices 133 may include volatile and nonvolatile, removable and non-removable media implemented in any method or technology for storage of information such as computer readable instructions, data structures, program modules or other data. The one or more memory devices 133 also may include one or more physical persistent memory devices and/or one or more non-persistent memory devices. The one or more memory devices 133 may include, but is not limited to, RAM, ROM, electronically erasable programmable read only memory (EE-PROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the one or more processors 131.

The one or more processors 131 may include a single central processing unit (CPU), which may be a single-core or multi-core processor (e.g., dual-core, quad-core, and the like), or may include multiple CPUs. In some cases, the one or more processors 131 may have various bit sizes (e.g., 16-bit, 32-bit, 64-bit, 96-bit, 128-bit, and the like) and various processor speeds (ranging from 100 MHz to 5 Ghz or faster). The one or more processors 131 and the associated components may allow the smart data engine computing system 130 to execute a series of computer-readable instructions, for example, to receive and/or monitor data scanned image data communicated from one or more input sources 110 via the network 105 (e.g., the Internet), the images associated with business functions supported by the business organization. Each image may include text recognizable through optical character recognition algorithms, where the text may include at least a portion of unstructured data. The smart data engine computing system 130 may analyze and classify the received data to identify key value pairs associated with the document types and to format the previously unstructured data into a structured data format (e.g., a data structure, an html file, and the like) recognizable by one or more of the data processing computing systems.

In some cases, the smart data engine computing system 130 may include the illustrative user interface 138 that may be capable of displaying one or more user interface screens 139 on a display device, that is either local to or remote from the smart data engine computing system 130. The user interface screens 139 may include screens for displaying information to the user and/or receiving information from the user.

The network connections depicted in FIG. 1 may include a local area network (LAN) and/or a wide area network (WAN), a wireless telecommunications network, a wired communications network and/or may also include other communications networks. When used in a LAN networking environment, the smart data engine computing system 130 may be connected to the communications network through a network interface or adapter such as the communication interface 133. When used in a WAN networking environment, the smart data engine computing system 130 and/or the communication interface 133 may include a modem or other means for establishing communications over the WAN, such as the Internet, a cellular network, and the like. When used in a wireless telecommunications network, the smart data engine computing system 130 may include one or more transceivers, digital signal processors, and additional circuitry and software for communicating with wireless computing devices (e.g., mobile phones, portable customer computing devices) via one or more network devices (e.g., base transceiver stations) in the wireless network.

In some cases, the smart data engine computing system 130 may include a security and integration layer (not shown), through which communications may be sent and managed between the smart data engine computing system 130 and the remote devices, input sources 110, the data processing systems 150 and/or other computing systems. The security and integration layer may include one or more computing devices, such as web servers, authentication servers, and various networking components (e.g., firewalls, routers, gateways, load balancers, and the like), having some or all of the elements described above with respect to the smart data engine computing system 130. As an example, security and integration layer may comprise a set of web application servers configured to use secure protocols and to insulate the smart data engine computing system 130 (e.g., one or more servers, a workstation, and the like) from external devices, such as the input devices 110 and/or the computing centers 120 to protect the private, sensitive, and/or non-public data of the scanned documents at the input sources 112a-112n and/or stored in the data repositories 140. In some cases, the security and integration layer may correspond to a set of dedicated hardware and/or software operating at the same physical location and under the control of same entities as the smart data engine computing system 130. For example, the security and integration layer may correspond to one or more dedicated web servers and network hardware in a data center or in a cloud infrastructure supporting a cloud-based application and/or process. In other examples, the security and integration layer may correspond to separate hardware and software components, which may be operated at a separate physical location and/or by a separate entity.

In some cases, the inference engine 120 and/or other components of the smart data engine computing system 130 may include an expert system in an interpreted computing language (e.g., Java, Python or the like) and/or in a compiled computing language (e.g., C, C++, and the like). In some cases, the expert system or other components may be written as a custom application without using an off-the-shelf package because, in some cases, since no single package fits the varied requirement of setting up rules for variety of use cases. In some cases, a portion of the software components of the expert system or other components may include a customizable application and/or other existing application to configure a computing device to perform a specific function. In some cases, an expert system implemented in the inference engine may be symbolically expressed as Expert System=Knowledge Base+Inference Engine. A rule-based system may be augmented with fuzzy logic to deal with imprecision and uncertainty about the knowledge base. It may be coupled with genetic algorithms and evolutionary programming to generate complex classifiers. The rule set may be a computerized representation of a human expert's knowledge. Hence, an artificial intelligence (AI) based expert system may be capable of recognizing information in a manner similar to a human expert, when exposed to the same (or similar) data. A knowledge base of the expert system may be continuously updated by an underlying Dictionary application and/or data repository that may be refreshed, in turn, by a Document Crawler that crawls through the variety of documents pertaining to particular industry segments, business organizations, business functions, and the like. Hence the knowledge base may be continuously updated and information can be extracted accurately using the inference engine 120 of the expert system implemented on the smart data engine computing system 130.

Every document identified and/or scanned at the input source(s) 110 includes at least two kinds of information—objective type information (e.g., name, country, date of contract, and the like) and subjective type information (e.g., terms and conditions, execution of contract details and the like). The smart data engine computing system 130 may process the received document information to generate content as a structured file and/or object that includes at least one or more of key/value pairs for objective fields, a precise summarization of free text fields, and highlighting of top key points. Once the content has been extracted from the scanned document in a structured manner, a whole range of processing options is opened for the data processing actions of the data processing systems 150.

Currently there is a wealth of information lying around across various industries and/or business functions in the form of scanned images/pdf, digital documents. However to use this largely untapped resource, large amounts of manpower has to be deployed. This is due to the extent to which usable data can be extracted and is severely limited by the format in which information is present in the digital/scanned files. The smart data engine computing system 130 has been programmed with a generic framework running on a machine learning and/or natural language processing (NLP) backbone built on top computing language (e.g., Python, Java, C, C++, and the like) libraries. An in-memory data repository (e.g., a database) or an external data repository may enhance the capability of the expert system to be trained to hit top accuracy benchmarks. The components and functionality of this tool are described below.

The expert system of the smart data engine computing system 130 may use a dictionary-based knowledge base, where the unstructured data available in an OCR extract of a scanned document image or a digital document needs to be extracted intelligently with high accuracy before it can be processed any further. The expert system using dictionary-based knowledge base may power a custom document object model parser that is capable of parsing a variety of source files to identify key value pairs, relevant free text and/or other information. Key value pairs may be identified by the expert system where, post parsing, key value pairs may be generated using a custom regular expression engine programmed to extract both objective and subjective information from any particular scanned document. An in-memory database may be used to provide a high throughput. The document crawler and/or a feedback loop may be used to help refresh the dictionary terms. In some cases, a Recurrent Neural Networks (RNN) may be used for free text processing of free text fields in digital documents, scanned documents, OCR data, and/or the like. The RNN may process instructions to summarize accurately free text information and to identify key points and this step is trainable to achieve high accuracy for data identification and classification. The smart data engine computing system 130 may deliver output in a format directly usable by an end user. For example, once the Once the RNN model is optimally trained a complete workflow is setup which can be reused.

Currently, no single solution exists to parse, both accurately and quickly, usable data from multiple unstructured data sources, particularly when scanned documents can be received from such varied sources and/or use cases. As such, the artificial intelligence based smart data engine computing system 100 provides a generalized solution for data extraction from variety of documents, each having a non-standardized structure and content data. During initial testing, the training accuracy for free text processing and key/value pair generation has tested to be in the 95-98% accuracy range. The framework run by the artificial intelligence based smart data engine computing system 100 may be run using one or more open source libraries that may be used to reprogram existing infrastructure to carry out this entire new data processing functionality. It is extremely difficult to setup a generic framework to extract structured data from documents from varies sources like scanned images and digital documents, because the structure of a scanned output file produced by an OCR processing device is purely driven by the OCR algorithm. Additionally, each OCR processing device has very limited tuning features. By generating key value pairs based on information stored in a dictionary data repository (e.g., data repository 240), the process speeds significantly and helps narrow down the scope of information that the smart data engine computing system 130 analyzes in the document, thus increasing processing times (e.g., processing a 10-page document in less than 4 seconds). Because the smart data engine computing system 130 operates using a machine learning, natural language processing backbone, the system is trainable and accuracy increases over time as more and varied scanned documents are analyzed by the framework. In some cases, the smart data engine computing system 130 may have extremely fast processing times by being based on an interpreted language (e.g., Python) implementation of the expert system module and a customized document object model parser module. In some cases, the interpreted language code may be modified at runtime, through feedback received from the system output. Custom keyword extraction algorithms may be built and processed by the expert system to create the custom dictionary and may be used to refresh the information and/or boost accuracy as the system is exposed to more training data, such as information received from a document crawler and/or system feedback. As such, the smart data engine computing system 130 allows for significant amounts of information, much of it previously unused due to the unstructured nature of the scanned and/or digital documents, to become immediately usable for additional processing as newly structured data by the data processing systems 150.

In some cases, a machine-learning engine (e.g., the inference engine 120) may have an ability to gather large amounts of varied keyword knowledge may be able to query and/or extract data entries in an on-demand basis using one or more statistical methods. In some cases, an increasing availability of online collaborative knowledge resources, the machine-learning engine (e.g., an expert system) may be designed to dynamically suggest possible key-value pairs and/or to summarize complex ideas by deriving one or more predicted solutions through reasoning instead of conventional procedural code. The machine-learning engine may use mass spectra of the historical data together with the knowledge base of procedures, contracts, electronic transaction information, industry and/or business sector information, to predict or identify a set of key value pairs and/or free text summaries.

Figure 2:
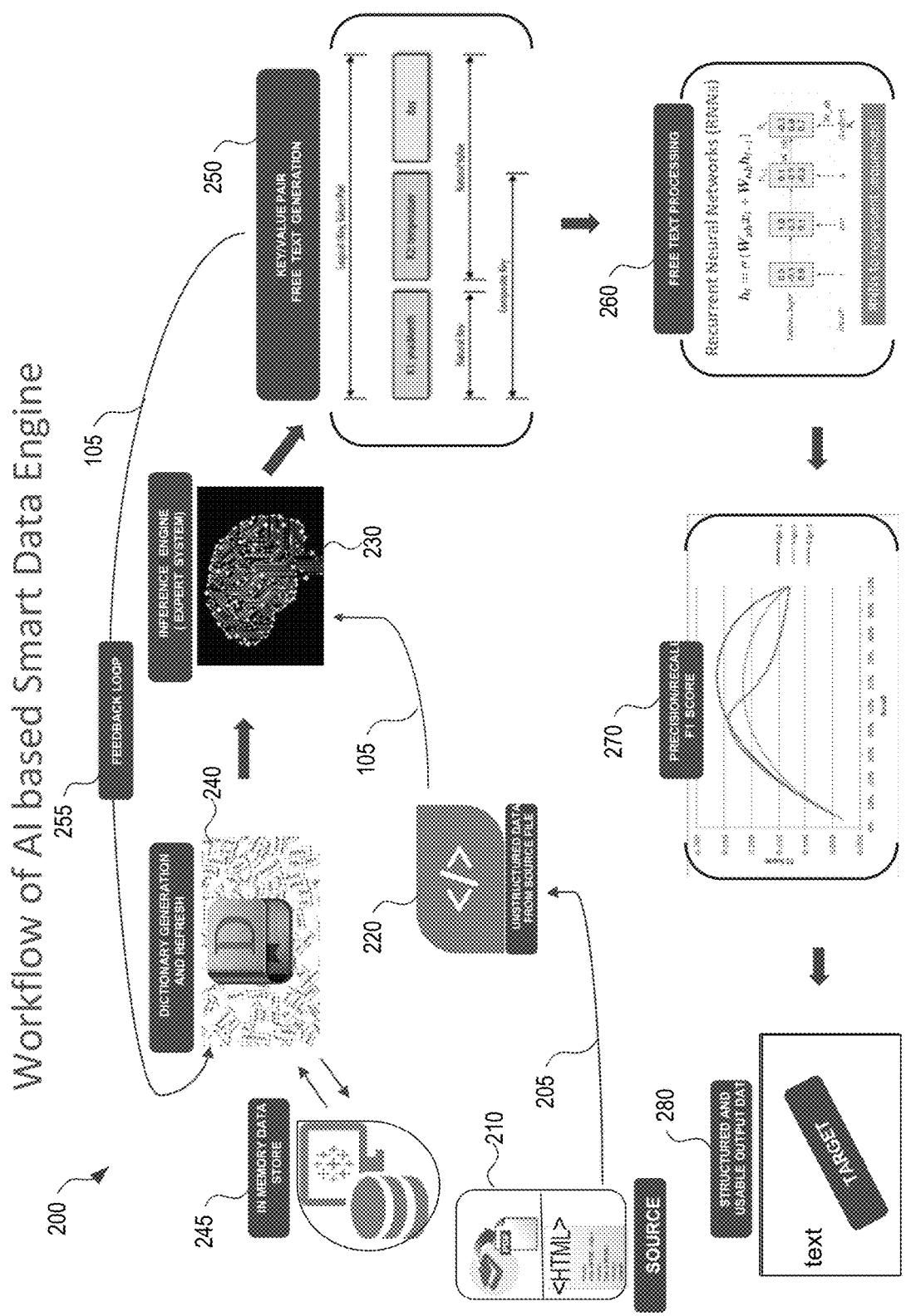
FIG. 2 shows an illustrative workflow process of the artificial intelligence based smart data engine computing system according to one or more aspects of the disclosure.

FIG. 2 shows an illustrative workflow process 200 of the artificial intelligence based smart data engine computing system 100 according to one or more aspects of the disclosure. At 210, one or more physical documents may be electronically scanned by a scanner device at an input source 110 (e.g., sources 112a-112n) and stored as an electronic file, such as a pdf document, a tiff document, an html document and/or the like. In some cases, the input source may provide one or more original electronic documents to be scanned (e.g., a word processor document, a website document, and/or another electronic file type). These documents may be associated with one or more transactions, electronic transactions, contractual relationships, or other agreement or business transaction. Because such documents may not have a common source, they may be created in different formats. While these documents may be "unstructured" and may not have a common format, the information may be included that may be use by one or more data processing systems. In the past, a majority of this information may not be processed due to the difficulty in obtaining useful information in the documents and/or an amount of effort required by a human to analyze and/or verify data retrieved from the file. In some cases, the scanned electronic documents may be processed by an electronic device processing one or more optical character recognition algorithms. In some cases, the output quality of the text recognized by the OCR algorithms may be dependent upon a quality of the scan and/or the scanner or imaging device. For example, in low resolution or poor quality images, the OCR algorithm may include more errors than in a scan or image of a higher resolution. At 220, the electronic documents and/or electronic files may be accessed, such as via a network 205 connection, by the smart data engine computing system 130 and stored in a local data repository (e.g., data repository 140, memory 132, and the like). In some cases, a copy of the original device may be communicated via the network 205. In some cases, an electronic file including OCR recognized text may be communicated. In some cases, a scanned document and an electronic file of the OCR recognized text may both be communicated to the smart data engine computing system 130 from the input sources 110.

At 230, an expert system module (e.g., the inference engine 120) may process instructions to analyze the OCR recognized text to identify key features associated with the corresponding electronic document. In some cases, the inference engine may process a fuzzy logic engine (not shown) to process an algorithm (e.g., a fuzzy algorithm) to analyze a format of the electronic document (e.g., a scanned image of a contract, an email contract, an electronic transaction receipt, an email, a letter, and the like), a function of the electronic document (e.g., a contract document, an email communication, an electronic transaction receipt, a sales offer, and the like), and/or the textual and/or graphical content of the electronic document. In some cases, one or more algorithms may be used based on the format, function and/or content of a particular electronic document or class of electronic document. In some cases, the algorithms may include a set of rules to configure the expert system to process and analyze an electronic document similar to a way a human expert would process a similar document. These algorithms may be used to identify key-value pairs (e.g., name: first name last name, address: street address, document: contract, document: electronic transaction receipt, and the like) and/or free text, such as contract terms, rates and conditions, certification statements, and the like. In some cases, the algorithms may process lines of free text and identify terms and/or ideas so that the inference engine 120 may generate a brief summary of the electronic document or a portion of the electronic document. In an illustrative example, the inference engine 120 may process an electronic document based on a set of rules, such as a set of fuzzy logic rules to identify a key-value pair. The set of fuzzy rules may include rules to answer questions such as such as (1) is this a known key word? (2) is this a known non-key word? (3) Does the word placement indicate a potential for being a keyword? (4) Do the words within 2 words before or after indicate this word is a key word? Additionally, the key-value pairs may be identified using the data stored in the dictionary data repository. The dictionary data repository may include a plurality of identified key terms for different industries, business sectors, and/or document types. The dictionary may be updated based on data input via a crawler interface, as discussed with respect to FIG. 4 and/or based on feedback from the expert system and/or an external user interface. In some cases, a data match quality indicator may be used to verify whether a new key term is included in the dictionary. Once identified, one or more key-value pairs data objects and or free text data objects may be stored in the data repository 140 and associated with the corresponding electronic document. The identified key-value pair data objects and/or free text data objects may be used to validate, refresh and/or update the data stored in the dictionary data repository via a feedback loop 255. In some cases, the dictionary may include key words having common spelling errors and/or text recognition errors (e.g., an identification of the letter 'O' as the number '0', a letter 'I' as a lower case 'l' and/or as the number '1', and the like).

At 350, the identified text may be additionally processed, such as to identify paragraph summaries and/or to identify free text data objects (e.g., terms and conditions of a contract, delivery conditions, and the like). In some cases, the smart data engine computing system 130 may include one or more machine learning modules, such as a recurrent neural network (RNN) module, to identify such text. The RNN module may use internal memory to process arbitrary sequences of text inputs to perform as unsegmented, connected task such as free text recognition. In some cases, the RNN module may process an algorithm to identify key ideas and/or words in a phrase, sentence or paragraph and output a brief (e.g., one word, two word, thee word) summary. In some cases, the RNN module may then process these brief summary data objects to generate document or paragraph summary object. In some cases, the RNN module may process the free text to identify phrases, sentences or paragraphs including desirable free text, such as terms and conditions of a contract, delivery terms, and the like. The RNN module may output a string data object associated with the key-value pairs and/or the corresponding electronic document. At 270, a data quality module of the smart data engine computing system 130 may analyze the output of the RNN module and/or the inference engine 120 (e.g., the value-pair data objects, the free text data objects, and the like) for accuracy. For example, the smart data engine computing system 130 may process instructions to identify a data quality score, such as an F1 score. The F1 score is a measure of the accuracy for identification of the key-value pairs and/or the free text identification. It may consider both the precision p and the recall r of the test to compute the score, where p is the number of correct positive results divided by the number of all positive results and r is the number of correct positive results divided by the number of positive results that should have been returned. The F1 score is the harmonic average of the precision and recall, where an F1 score reaches its best value at 1 (perfect precision and recall) and worst at 0. While the F1 score is discussed, its discussion is not meant to be limited as other data quality metrics may be used. In some cases, some or all determined data such as the identified key-value pair data objects, the free text data objects, the quality scores may be stored in a data repository (e.g., the data repository 140) and made accessible to external data analysis systems (e.g., the data processing systems 150) and/or the like. In some cases, a quality score may be associated with the analyzed electronic document and/or a portion of the data identified from the electronic document (e.g., the key-value data objects, the free text data object) and made available to the data processing systems 150 in determining whether to use or provide weighting inputs to data analysis algorithms.

Figure 3:
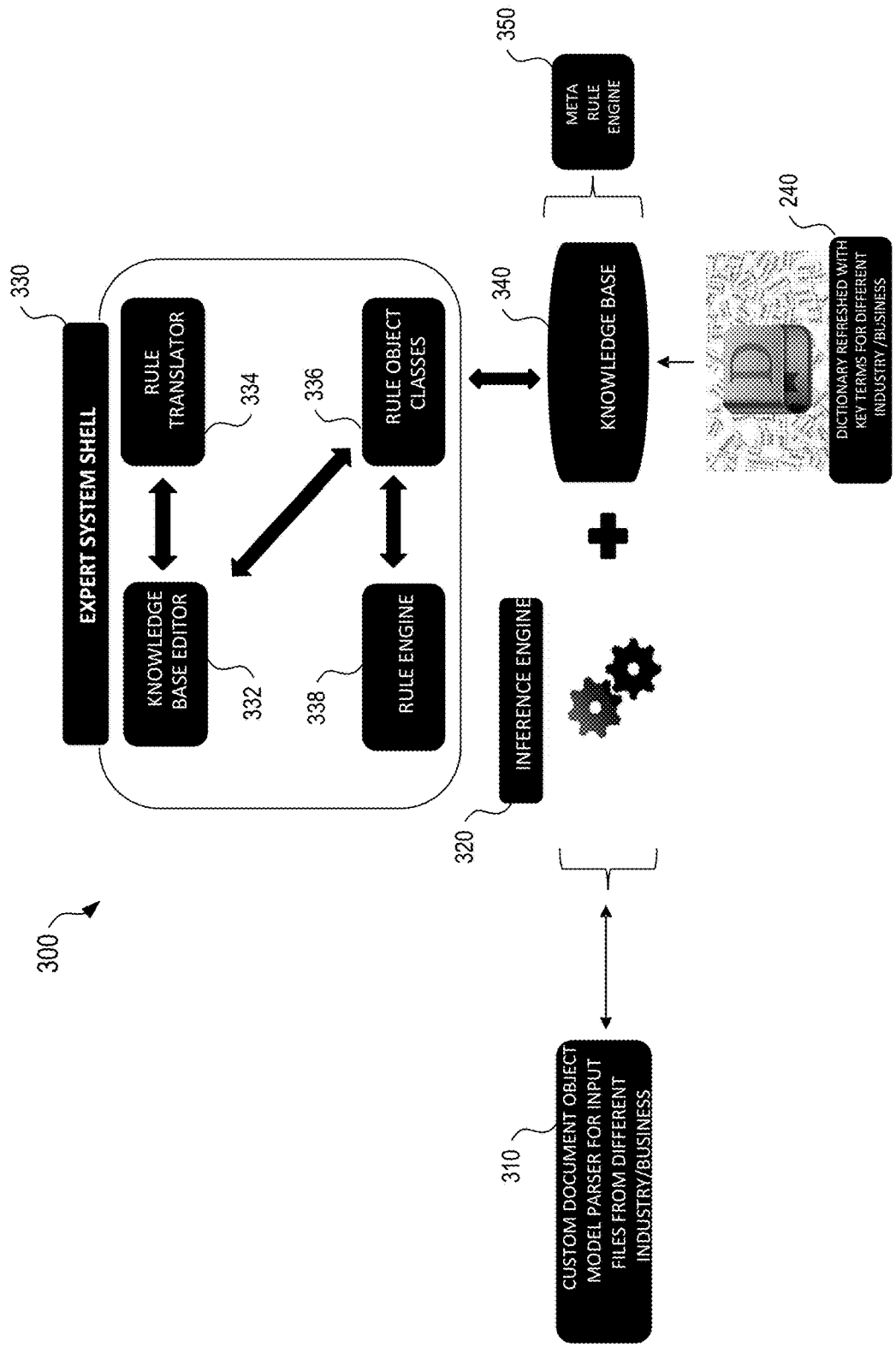
FIG. 3 shows an illustrative expert system block diagram implemented by the artificial intelligence based smart data engine computing system according to one or more aspects of the disclosure.

FIG. 3 shows an illustrative block diagram of an expert system computing system 300 implemented by the artificial intelligence based smart data engine computing system 100 according to one or more aspects of the disclosure. The expert system computing system 300 may include an expert system shell 330 including a knowledge base editor 332, a rule translator 334, a rule object class data repository 336, a rules engine 338, and a document object parser 310, an inference engine 320, a knowledge base data repository 340, a meta rule engine 350, and the dictionary data repository 240. In some cases, the document object parser 310 may process instructions to receive and process input files received via the network 205 (e.g., the network 105). The document parser may be configured to pass the textual data objects associated with the electronic document to the inference engine for processing and/or associate a document identifier to the associated document and/or textual data. The inference engine 320 may process one or more sets of rules in conjunction with the knowledge base, the meta rules engine and the dictionary to identify a document type (e.g., a contract, a letter, an electronic receipt, and the like), one or more business sectors or industries associated with the electronic document (e.g., retail, banking, investing, real estate, and the like), a document format (e.g., a formal contract, an informal contract, a business letter, a personal email, an electronic sales receipt, a financial transaction record, and the like). The expert system shell 330 may be used to manage the knowledge base 340 and/or the meta rules engine 350 based on a set of rule object classes stored in the rule object class data repository 336 and processed by the rules engine 338. The knowledge base editor 332 may manage information stored in the knowledge base based on feedback received and/or quality values associated with processed electronic documents and/or other rules. The rules translator 334 may be used to translate a set of rules to customize the function based on an identified document type, business sector and/or industry.

Figure 4:
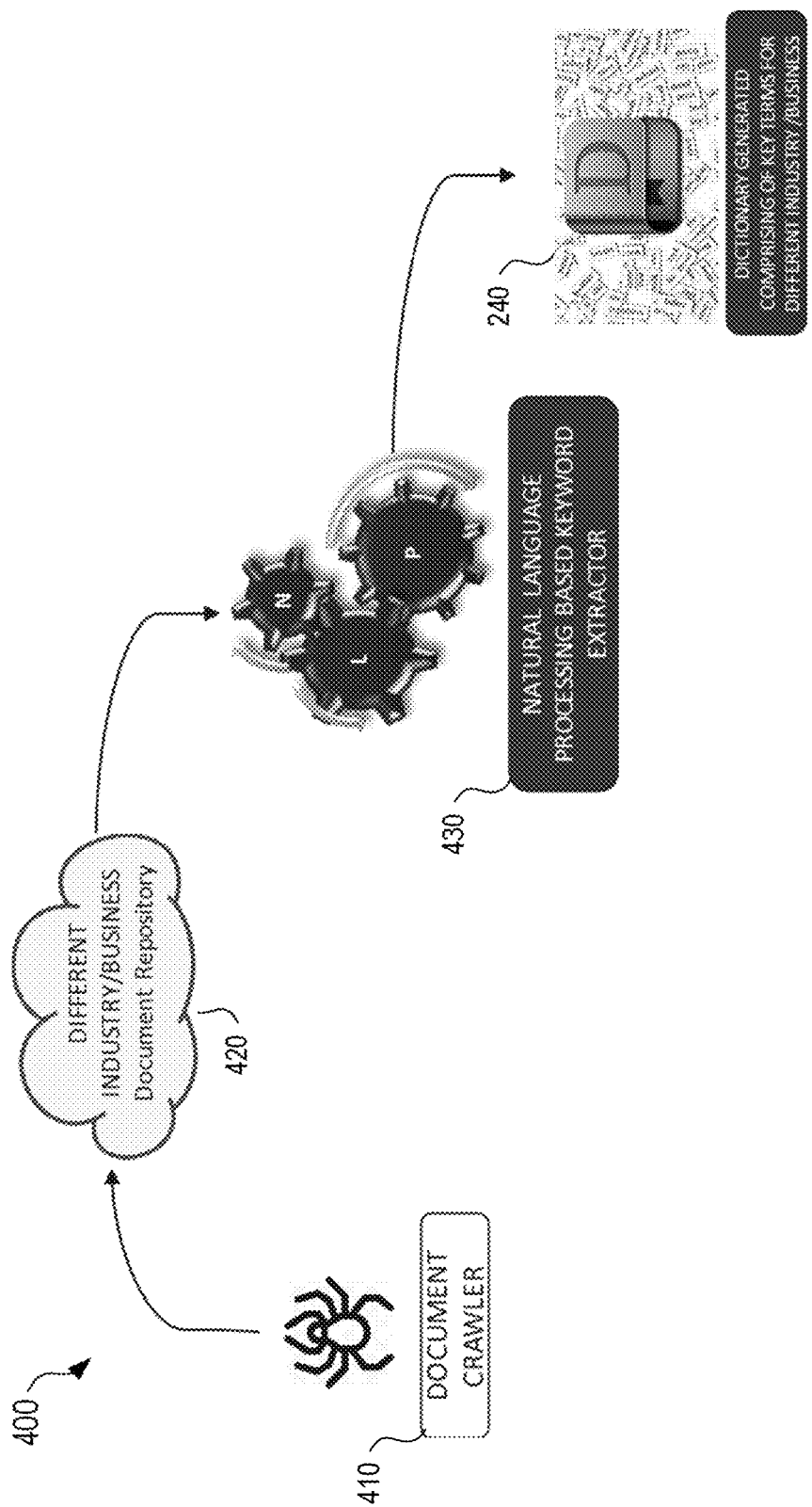
FIG. 4 shows an illustrative process of updating a key term data repository used by the artificial intelligence based smart data engine computing system according to one or more aspects of the disclosure.

FIG. 4 shows an illustrative process 400 of updating a key term data repository used by the artificial intelligence based smart data engine computing system 100 according to one or more aspects of the disclosure. In some cases, the dictionary data repository may include a listing of key terms associated with one or more different industry and/or business sectors. These key terms may be updated in a number of ways, including feedback from the inference engine 120. In some cases, the key terms stored in the dictionary data repository may be updated via a document crawler application 410. The document crawler may spawn one or more threads to fetch electronic documents from a plurality of input sources via a network interface (e.g., the network 105). The documents may be cached locally to the document crawler in a memory of the smart data engine computing system 130. In some cases, the document crawler application 410 may identify documents by industry, business sector, and/or document type and store a copy of the documents in a data repository 420. These documents may be processed, such as by a natural language processing (NLP) based keyword extractor application 430 processing instructions to identify key words based on an industry, business sector, and/or document type associated with the particular document. The NLP keyword extractor application 430 may then store the identified key words in the dictionary data repository.

FIGS. 5A and 5B show illustrative transaction documents 500 and 550 processed by the artificial intelligence based smart data engine computing system according to one or more aspects of the disclosure. The documents 500 and 550 are illustrative examples of unstructured documents that may be received from different parties. The format differences of these documents show the difficulty in extracting usable data from such documents, particularly when received from different sources. The illustrative documents 500 and 550 show that for a same transaction or contractual agreement, each party may have a different preferred format for presenting data. While similar data exists, different key words and/or data locations may be used.

FIGS. 6A and 6B show illustrative key-value pair data outputs identified from transaction documents processed by the artificial intelligence based smart data engine computing system according to one or more aspects of the disclosure. In this illustrative example, the key value pairs are shown as file outputs, but could be presented in different formats (e.g., a table, and the like). The file 600 shows illustrative key value pair data objects and free text data objects identified from electronic document 500 and the file 650 shows illustrative key value pair data objects and free text data objects identified from electronic document 650. While similar information is shown, each document may have a particular presentation and/or keyword associated with the information. FIG. 7 shows illustrative comparison data for transaction documents processed by the artificial intelligence based smart data engine computing system according to one or more aspects of the disclosure.

Figures 8A, 8B:
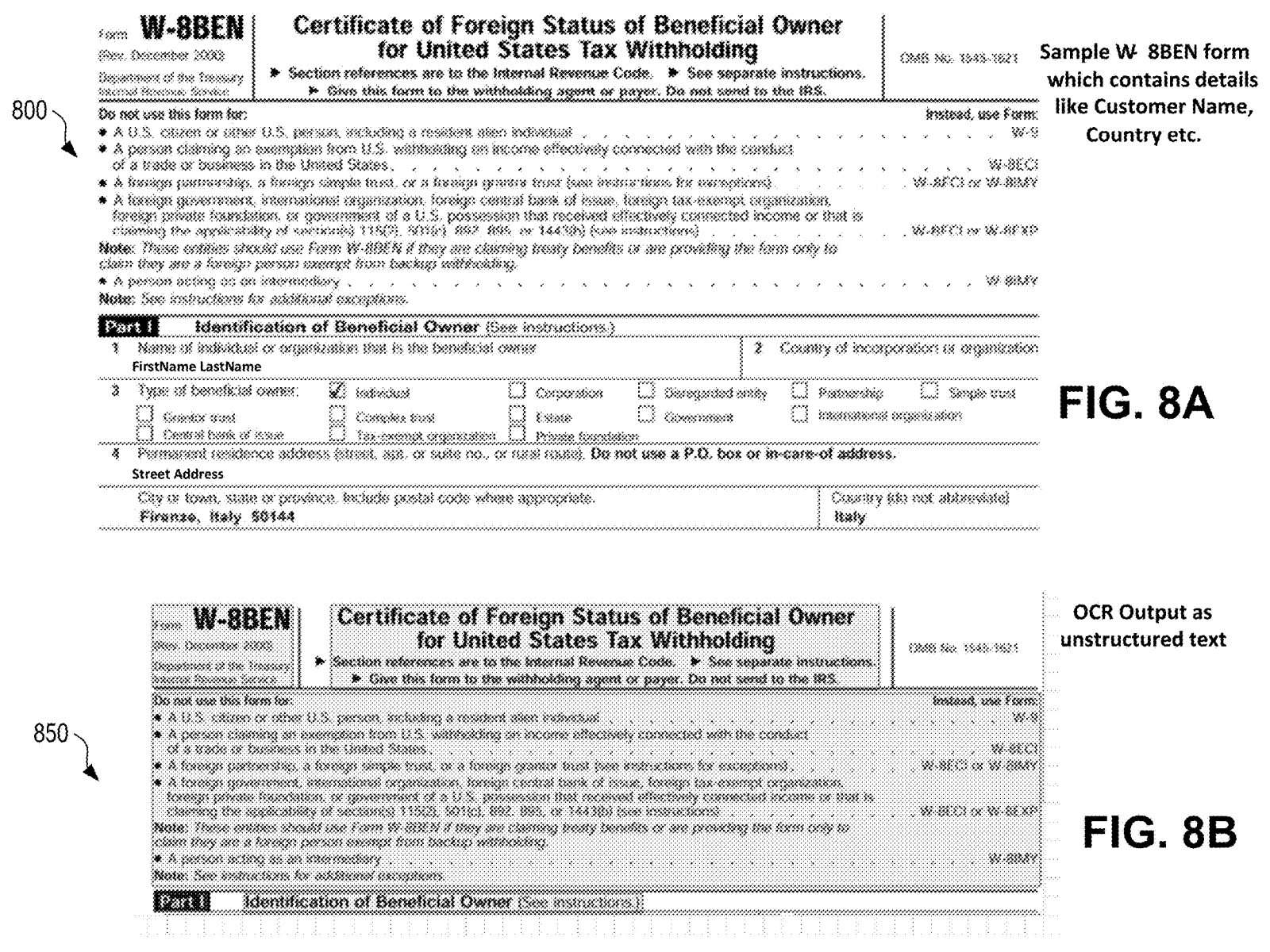
Figure 9:
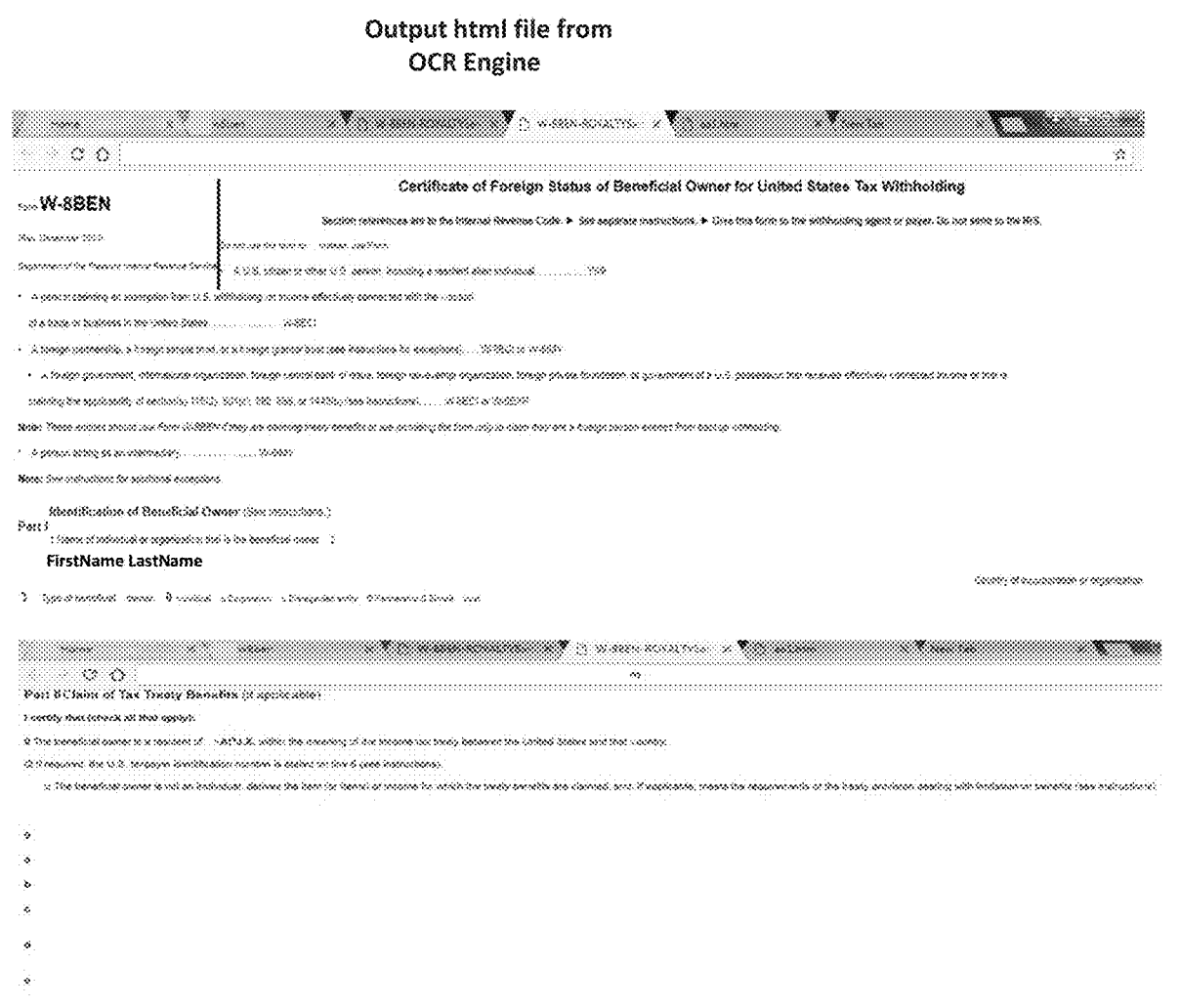
Figure 10:
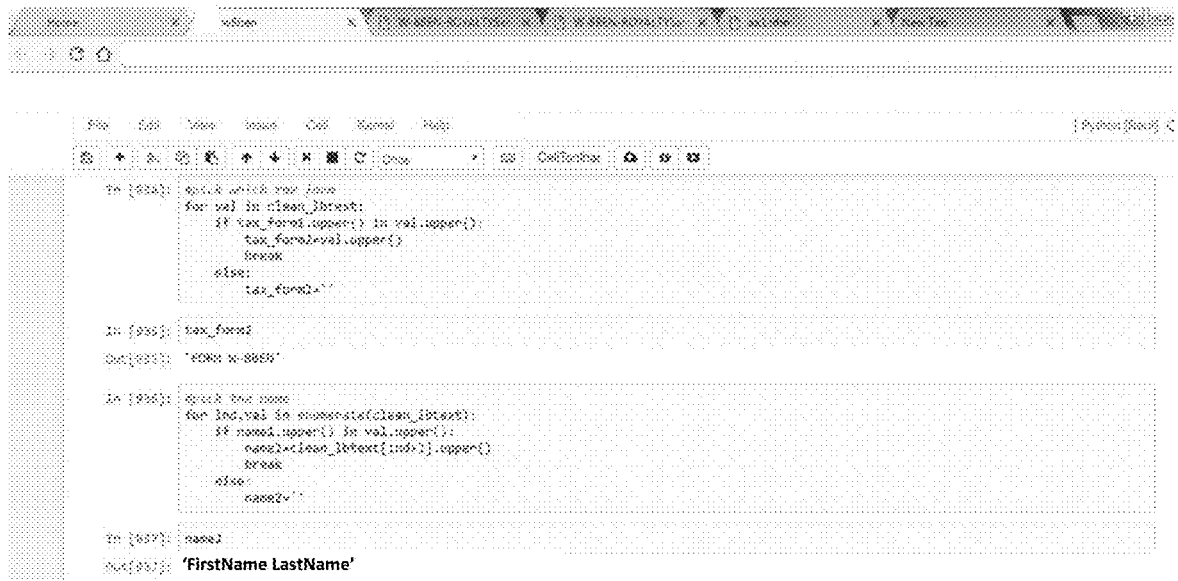
FIG. 10 shows illustrative key value pair identifier code processed by the artificial intelligence based smart data engine computing system according to one or more aspects of the disclosure.
Figures 11, 12:
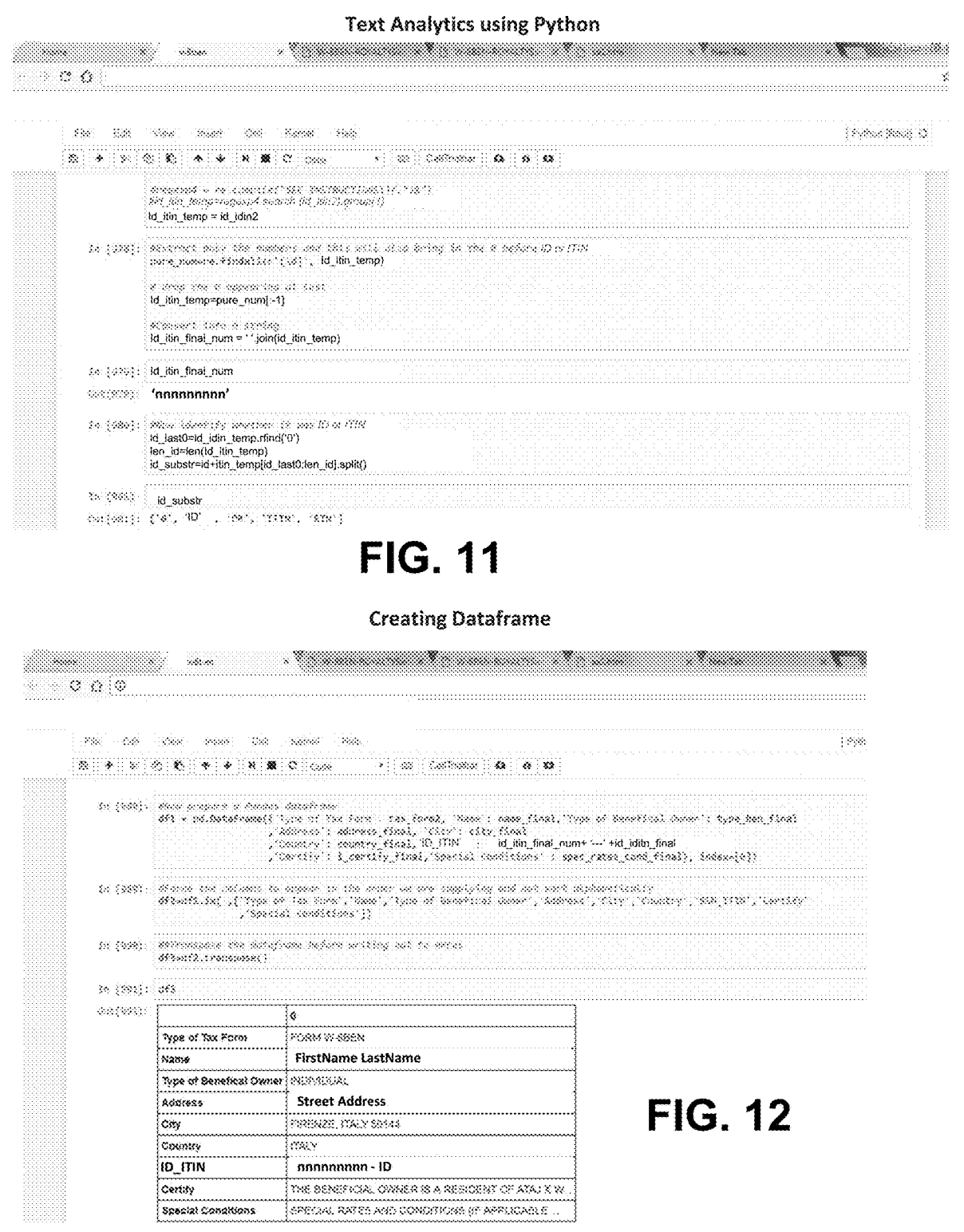

FIGS. 8A and 8B show an illustrative tax form 800 and identified text 850 processed by the artificial intelligence based smart data engine computing system 130 according to one or more aspects of the disclosure. FIG. 9 shows an illustrative hypertext markup language (HTML) file output from an optical character recognition (OCR) engine of the artificial intelligence based smart data engine computing system 130 according to one or more aspects of the disclosure based on an analysis of the identified text 850 of the illustrative tax form 800. FIG. 10 shows illustrative key value pair identifier code processed by the artificial intelligence based smart data engine computing system 130 according to one or more aspects of the disclosure. FIG. 11 shows illustrative textual analytics code processed by the artificial intelligence based smart data engine computing system 130 according to one or more aspects of the disclosure. FIG. 12 shows illustrative data frame generation code processed by the artificial intelligence based smart data engine computing system 130 according to one or more aspects of the disclosure and FIG. 13 shows an illustrative output file from the artificial intelligence based smart data engine computing system 130 according to one or more aspects of the disclosure.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. An artificial intelligence based computing system comprising:
a first data repository storing a plurality of electronic documents, each document of the plurality of electronic documents including at least one text data object; and
an expert system computing device of a robotic process automation pipeline, the expert system computing device including:
a processor; and
a non-transitory memory device storing instructions that, when executed by the processor, cause the expert system computing device to:
receive, via a communication interface, a first data object comprising unstructured data identified from the at least one text data object of an electronic document stored in the first data repository;
process, by an inference engine, a first set of rules to identify at least one key-value pair data object from the first data object;
process, by a recurrent neural network of an inference engine, a second set of rules to identify at least one free text data object from the first data object and generate a text summary of a first free text data object and at least one key point;
receive, from a data crawler computing device, a training data set continuously updated from a second data repository comprising a plurality of documents associated with different business segments and/or business activities;

train the recurrent neural network based on the training data set and the generated text summary of the first free text data object and the at least one key point;
store, in an on board non-transitory memory, the at least one key-value pair data object and the at least one free text data object; and
modify, automatically and at runtime, interpreted language code of the instructions to build customized keyword extraction algorithms, based on information received from the data crawler computing device and feedback comprising the at least one key-value pair data object and the at least one free text data object, wherein the customized keyword extraction algorithm comprises an optical character recognition (OCR) algorithm.

2. The artificial intelligence based computing system of claim 1, further comprising:
an imaging device providing a digital image of each of a plurality of text documents, wherein the imaging device stores each digital image of the plurality of text documents in the first data repository as the plurality of electronic documents.

3. The artificial intelligence based computing system of claim 2, further comprising:
an OCR computing device communicatively coupled to the imaging device, wherein the OCR computing device processes each digital image to extract text data and associates the extracted text data with a corresponding electronic document as the at least one text data object.

4. The artificial intelligence based computing system of claim 1, wherein the first set of rules comprises a fuzzy rule set.

5. The artificial intelligence based computing system of claim 1, wherein the second set of rules comprises a recurrent neural network rule set.

6. The artificial intelligence based computing system of claim 1, wherein the inference engine identifies at least one key-value pair data object based on a data repository storing key terms associated with a plurality of different business segments.

7. The artificial intelligence based computing system of claim 1, wherein the inference engine identifies at least one key-value pair data object based on key term data stored in a dictionary data repository, wherein the key term data are associated with a plurality of different business segments.

8. The artificial intelligence based computing system of claim 1, wherein the inference engine identifies at least one key-value pair data object based on key term data stored in a dictionary data repository, wherein the key term data are associated with an identified document type corresponding to an analyzed electronic document.

9. The artificial intelligence based computing system of claim 1, further comprising:
a data crawler application processed by the data crawler computing device, the data crawler application processing instructions stored in a memory device that, when executed by a processor, cause the data crawler computing device to:
identify, via a network, the plurality of documents associated with different business segments and/or business activities; and
store each of the plurality of documents in a second data repository.

10. The artificial intelligence based computing system of claim 1, further comprising:
a natural language processing (NLP) computing device processing instructions stored in a memory device that, when executed by a processor, cause the NLP computing device to:
identify at least one key term from each of a plurality of documents stored in a second data repository; and
store each key term in a dictionary data repository.

11. An artificial intelligence based computing device comprising:
a first data repository storing a plurality of electronic documents, each document of the plurality of electronic documents including at least one text data object;
a processor; and
a non-transitory memory device storing instructions that, when executed by the processor, cause the artificial intelligence based computing device to enable a computing device of a robotic process automation pipeline to:
analyze a first data object comprising unstructured data identified from the at least one text data object of an electronic document stored in the first data repository;
identify, by an inference engine processing a first set of rules, at least one key-value pair data object from the first data object;
identify, by a recurrent neural network of an inference engine processing a second set of rules, at least one free text data object from the first data object and generate a text summary of a first free text data object and at least one key point;
train the recurrent neural network based on the generated text summary of the first free text data object and the at least one key point;
store, in a non-transitory memory device, the at least one key-value pair data object and the at least one free text data object; and
modify, automatically at runtime, interpreted language code of the instructions to build customized keyword extraction algorithms, based on information received from a data crawler computing device and feedback comprising the at least one key-value pair data object and the at least one free text data object.

12. The artificial intelligence based computing device of claim 11, wherein an imaging device provides a digital image of each of a plurality of text documents and stores each digital image of the plurality of text documents in the first data repository as the plurality of electronic documents.

13. The artificial intelligence based computing device of claim 12, wherein an optical character recognition (OCR) computing device processes each digital image to extract text data and associates the extracted text data with a corresponding electronic document as the at least one text data object.

14. The artificial intelligence based computing device of claim 11, wherein the first set of rules comprises a fuzzy rule set.

15. The artificial intelligence based computing device of claim 11, wherein the second set of rules comprises a recurrent neural network rule set.

16. The artificial intelligence based computing device of claim 11, wherein the inference engine identifies at least one key-value pair data object based on a data repository storing key terms associated with a plurality of different business segments.

17. The artificial intelligence based computing device of claim 11, wherein the inference engine identifies at least one key-value pair data object based on key term data stored in a dictionary data repository, wherein the key term data are associated with a plurality of different business segments.

18. The artificial intelligence based computing device of claim 11, wherein the inference engine identifies at least one key-value pair data object based on key term data stored in a dictionary data repository, wherein the key term data are associated with an identified document type corresponding to an analyzed electronic document.

19. The artificial intelligence based computing device of claim 11, further comprising a data crawler application identifying, via a network, a plurality of documents associated with different business segments and/or business activities and storing each of the plurality of documents in a second data repository.

20. The artificial intelligence based computing device of claim 11, further comprising a natural language processing algorithm identifying at least one key term from each of a plurality of documents stored in a second data repository and storing each key term in a dictionary data repository.

\* \* \* \* \*